United States Patent
Wootton et al.

(10) Patent No.: US 6,404,553 B1
(45) Date of Patent: Jun. 11, 2002

(54) PHASE ACTIVE DIFFRACTIVE OPTICAL METHOD

(75) Inventors: John R. Wootton; Gary Waldman, both of County of St Louis; David L. Holder, County of St. Charles, all of MO (US)

(73) Assignee: Engineered Support Systems, Inc., St. Louis, MO (US)

( * ) Notice: Subject to any disclaimer, the term of this patent is extended or adjusted under 35 U.S.C. 154(b) by 0 days.

(21) Appl. No.: 08/810,591

(22) Filed: Mar. 4, 1997

Related U.S. Application Data

(63) Continuation of application No. 08/636,919, filed on Apr. 24, 1996, now abandoned, which is a continuation of application No. 08/192,588, filed on Feb. 7, 1994, now abandoned.

(51) Int. Cl.$^7$ .............................. G02B 5/18; G02B 5/32; G03H 1/08; G02F 1/13
(52) U.S. Cl. ............................ 359/573; 359/9; 349/201
(58) Field of Search .................................. 359/9, 11, 15, 359/19, 21, 565, 573, 202, 571; 349/201

(56) References Cited

U.S. PATENT DOCUMENTS

| | | | | |
|---|---|---|---|---|
| 3,309,162 A | * | 3/1967 | Kosanke et al. ............ | 359/565 |
| 3,402,001 A | * | 9/1968 | Fleisher ...................... | 359/565 |
| 3,653,742 A | * | 4/1972 | Buchan ....................... | 359/565 |
| 3,806,897 A | * | 4/1974 | Buchan et al. ................ | 359/21 |
| 3,861,784 A | * | 1/1975 | Torok .......................... | 359/573 |
| 3,980,396 A | * | 9/1976 | Pollack et al. ............... | 359/573 |
| 3,980,403 A | * | 9/1976 | Pollack ........................ | 359/573 |
| 4,585,307 A | * | 4/1986 | Dammann et al. ........... | 359/571 |
| 4,639,091 A | * | 1/1987 | Huignard et al. ............ | 359/573 |
| 4,679,901 A | * | 7/1987 | Dammann et al. ........... | 395/571 |
| 4,776,669 A | * | 10/1988 | Dammann et al. ........... | 359/571 |
| 4,952,034 A | * | 8/1990 | Azusawa et al. ............ | 359/202 |
| 5,151,814 A | * | 9/1992 | Grinberg et al. ............. | 359/573 |
| 5,278,679 A | * | 1/1994 | Davis et al. ................. | 359/565 |

OTHER PUBLICATIONS

Renate Ondris–Crawfore, Gregory P. Crawford, and J. William Doane The Phase of the Future, vol. 30, Sep. 1992.

* cited by examiner

*Primary Examiner*—Jon Henry
(74) *Attorney, Agent, or Firm*—Polster, Lieder, Woodruff & Lucchesi, L.C.

(57) ABSTRACT

A method for effecting the desired optical characteristics of an optical system (10) using phase diffractive optics. Incident light ($B_i$) is directed onto a surface ($12_i$) of a material (12) whose index of refraction (n) is variable over the material. Passage of the incident light through the material effects the phase and amplitude of the light waveform. An optical map ($O_m$) is determined for the surface of the material. This map comprises variations in the index of refraction over the material surface, and the map, in effect, represents any of a range of refractive and diffractive optical elements such as a mirror (1), a lens (2,3,6,7), or a diffraction grating (100). The map is dynamically written onto the material to map the material such that the incident light's passage through the material corresponds to the passage of the light through the optical element currently emulated by the material. As a result, emergent light ($B_e$) from the material has similar amplitude and phase characteristics as if the incident light had passed through the desired optical element.

1 Claim, 11 Drawing Sheets

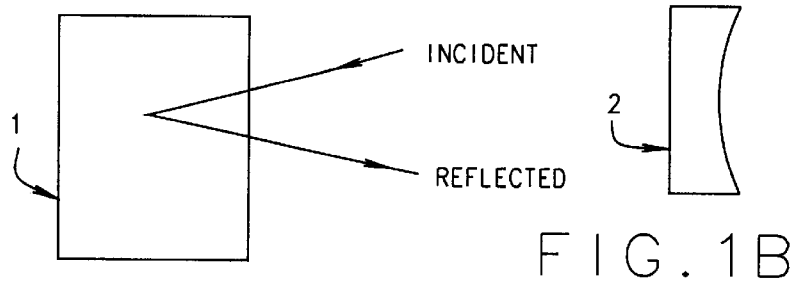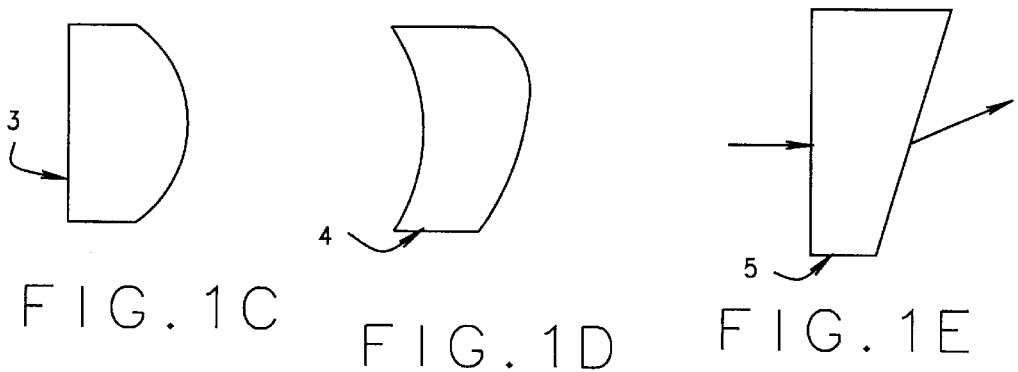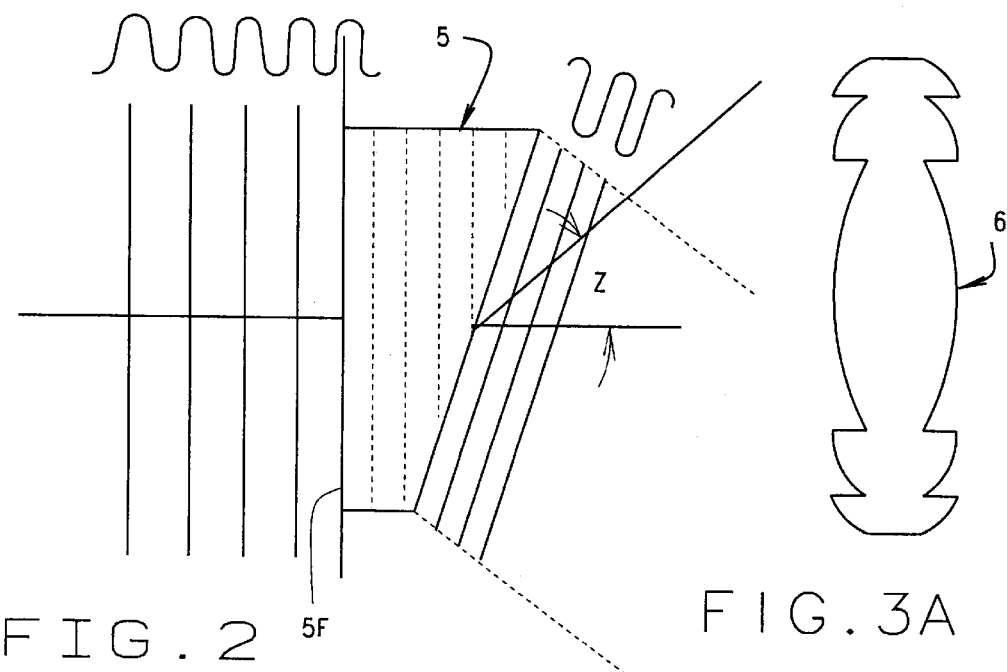

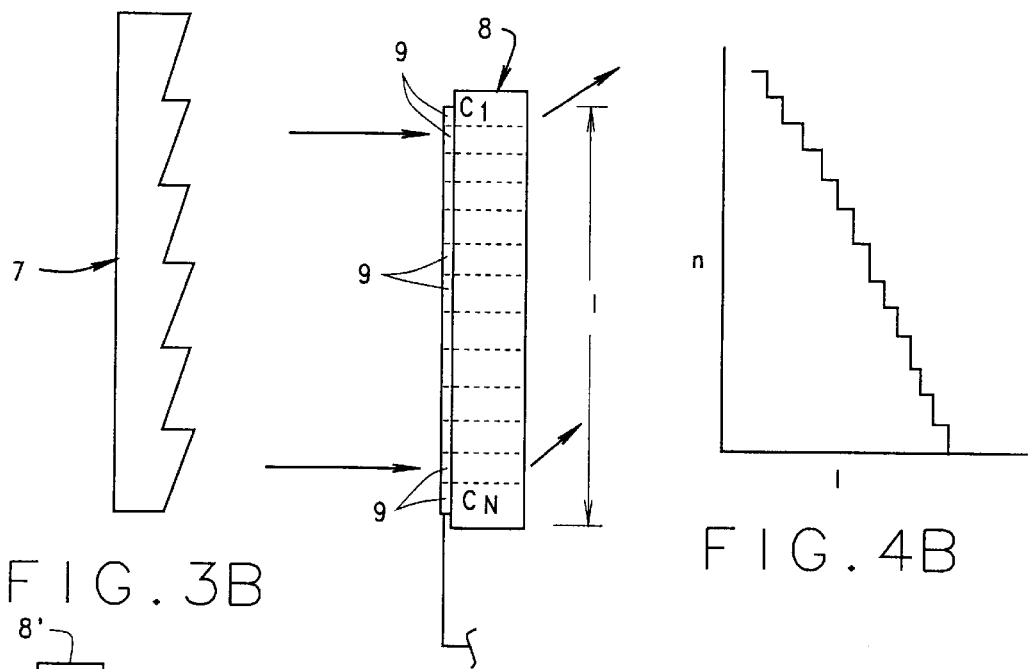
FIG.3B
FIG.4A
FIG.4B
FIG.4C
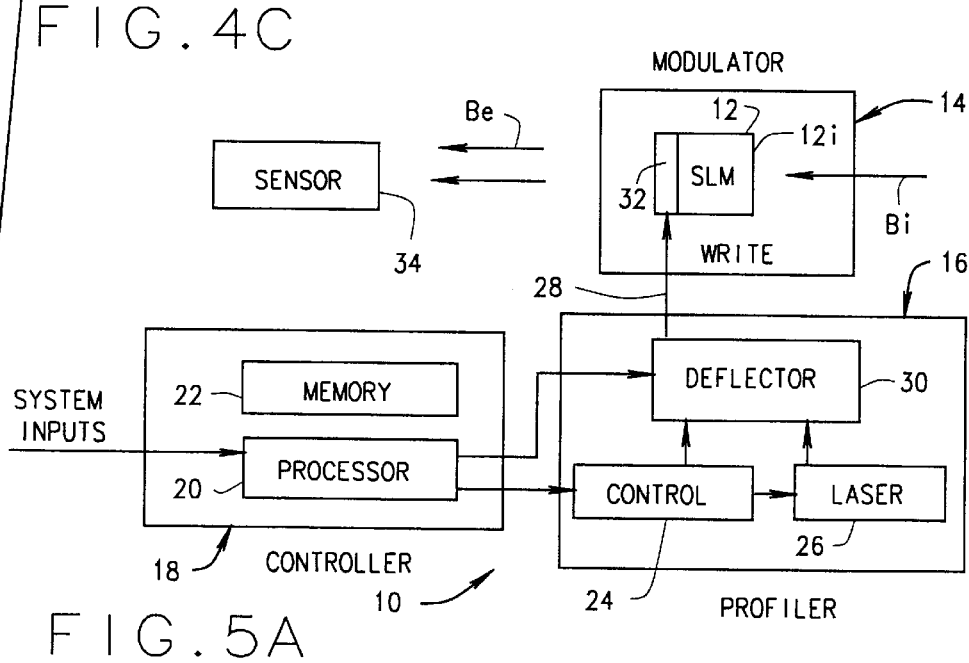
FIG.5A

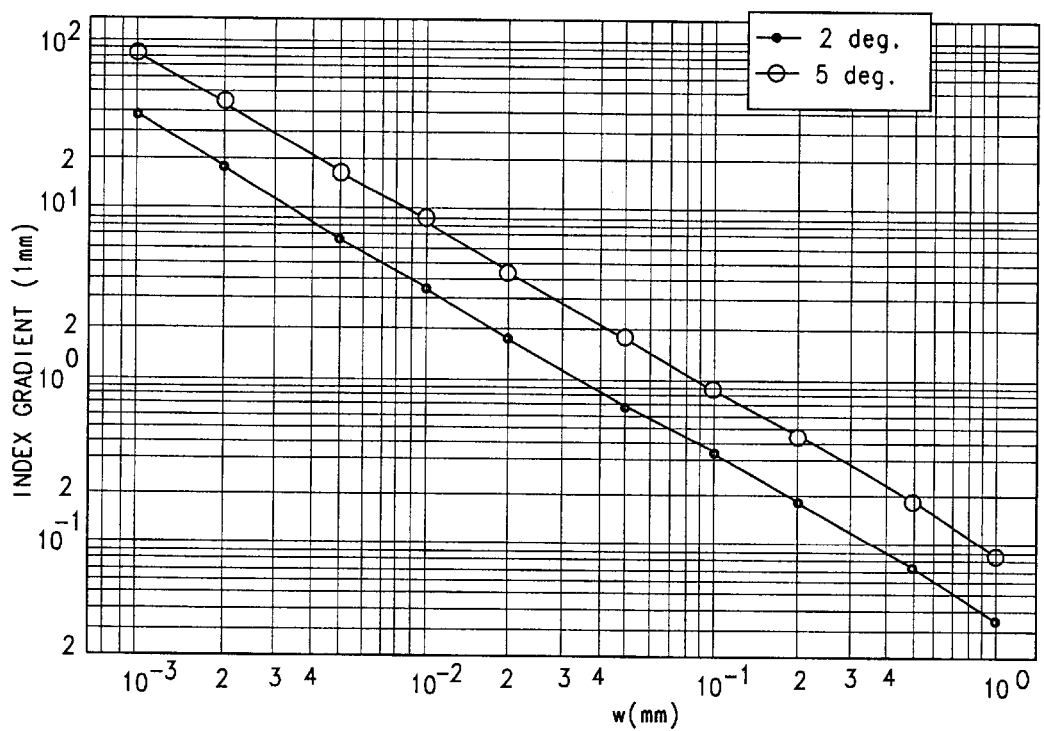
FIG. 15
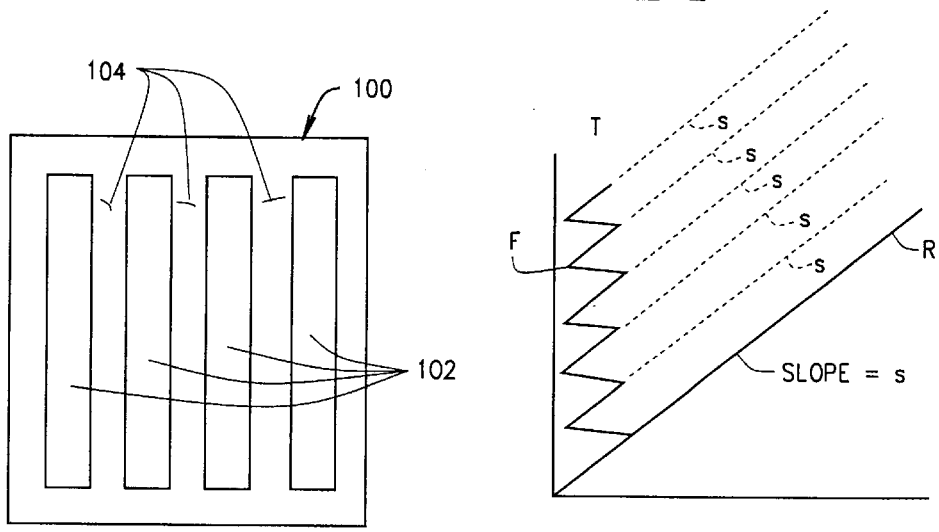
FIG. 17
FIG. 16

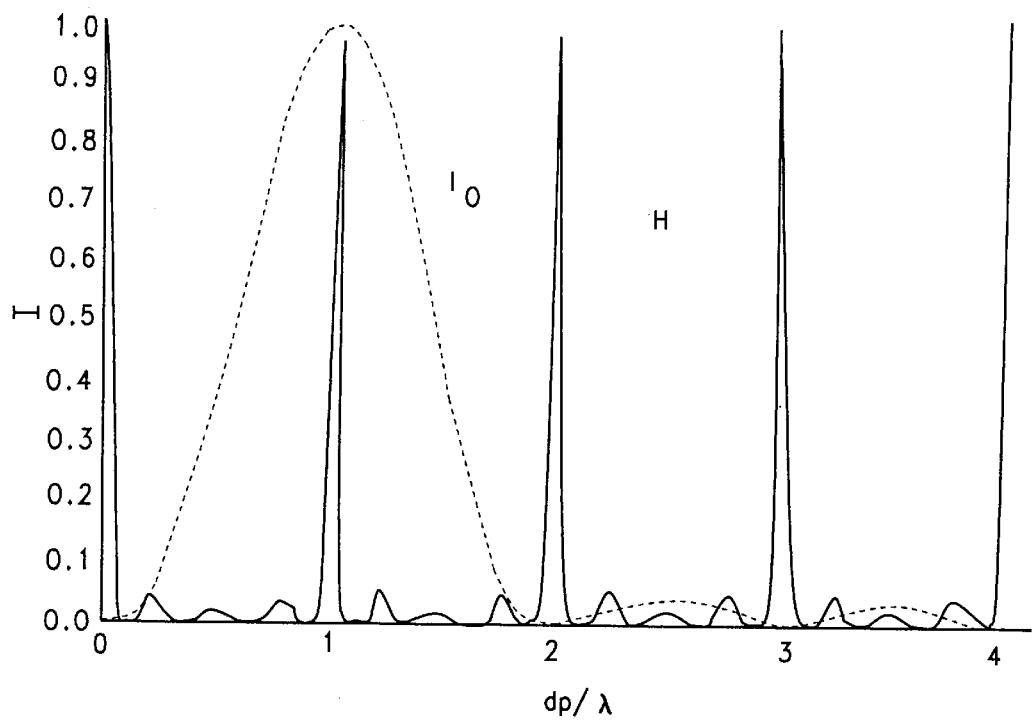
FIG. 18
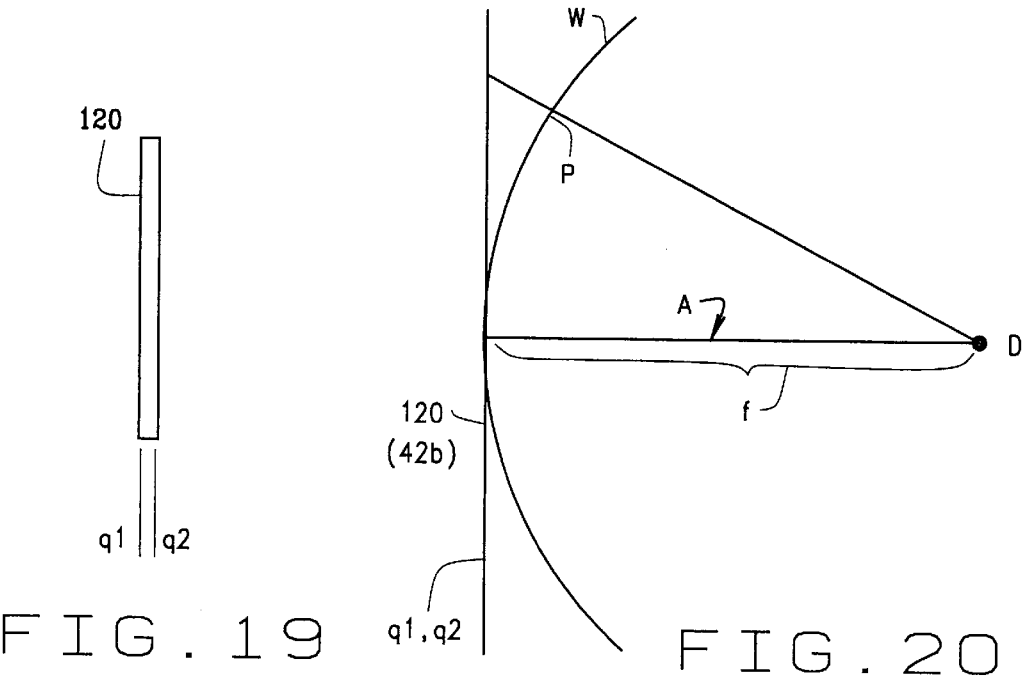
FIG. 19
FIG. 20

PHASE ACTIVE DIFFRACTIVE OPTICAL METHOD

This is a continuation application of copending application Ser. No. 08/636,919 filed on Apr. 24, 1996, now abandoned, which is a continuation application of copending application Ser. No. 08/192,588, filed on Feb. 7, 1994, now abandoned.

BACKGROUND OF THE INVENTION

This invention relates to optical systems and classical optical components used in them, and more particularly, to a method utilizing a phase active diffractive optical system for emulating such components, and doing so in a dynamic manner.

Conventional refractive optical systems employ physical elements which have a particular geometric shape. Such elements include wedges or prisms, concave and convex lens, etc. As is well-known, an optical beam directed at one of these elements has both an amplitude and a phase component. These values are uniform along the wavefront of the beam as it travels through space, and these values are independent of the beam's wavelength. The beam impinges on the element and passes through or is reflected by it. The reflected or emergent beam has an amplitude and phase relationship which may now vary, along the beam wavefront, from that of the incident beam. This change in amplitude and phase is a function of both the shape of the element and its index of refraction. The index of refraction for an optical element is given by the formula;

$$n=c/v$$

where v is the speed of light in a material and c is the speed of light in a vacuum. In a vacuum, the speed of light is approximately 186,000 miles/second ($3.0 \times 10^8$ meters/second). Classically, mirrors, lens, prisms, and the other elements are made of a material (e.g., glass) which has a constant set of properties including an index of refraction. Thus, the effects of passing light through these geometrically shaped elements or reflecting the beam off of them tend to be uniform over the element and are readily determined. However, it has been a characteristic of many of these elements, almost from their inception and regardless of the material from which they are made, to suffer from various aberrations.

An additional problem with use of optical elements in various systems is weight. In optical systems used to achieve greater and greater ranges, the aperture for the system increases as a function of the desired range. There is a correlation in aperture increase and increase in weight. Also, for moving and/or unstable platforms such as helicopters or ships at sea, platform stability is also an important factor. There is a correlation between the required degree of stability and overall system weight. As a practical matter, the weight and cost of an optical system varies as a function of the cube of aperture size. Stabilization has an inverse relationship to aperture size. To reduce weight and lower system's cost, modifications can be made to the shape of the optical components. Typically, this involves altering the shape of the element as a function of $2\pi$ of the wavefront such as in a Fresnel lens. The disadvantage of this approach is that although it works, it does make the optical system frequency dependent.

Recently, work has been done using diffractive optics instead of the refractive optical elements discussed above. In optical diffraction, light waves are bent or spread apart as they pass through a diffractive element. The waves subsequently interfere or interact with each other so as to mutually reinforce themselves in one area and while weakening themselves in another. Diffractive devices include, for example, Fresnel zone plates, Gabor zone plates, etc. The functioning of these and other diffractive elements is based on Fourier optic principles. Further, it is a feature of these devices that they are fixed devices; i.e., their optical characteristics, for example, the focus of a zone plate, may not be interactively altered. In this regard, they are similar to conventional refractive optical devices.

Devices such as spatial light modulators have been developed by which the amplitude of an incident light beam is effected as the beam is transmitted through a diffractive element. In these devices, an aperture map is created to achieve a desired output from the diffractive element. For this purpose, the element is made from one of a group of electro-optical materials referred to as birefringent materials. These materials are capable of having more than one index of refraction. As such, the materials may be controlled to produce a refraction map, or refraction index profile, which covers a surface of the material and which includes multiple refraction indexes. Typically, a birefrin material has a uniform set of physical and chemical properties throughout the material. But, these properties can be externally controlled to produce localized variations in the material's refractivity. The control mechanism may be either electronic or optical.

One use of birefringent materials has been in optical calculators. Here, the amplitude of an incident beam of light is altered, at differing points along the wavefront, to produce a desired binary value. This is done by impinging the light beam onto the surface of the birefringent material. As noted, the surface of the material is mapped to produce a desired refraction profile or index gradient. This involves use of spatial light modulation, or SLM. If SLM is done electronically, transparent electrodes are spatially arranged along one side of the piece of birefringent material. The electrodes are then selectively energized when a light beam impinges on the material. The result is a series of localized channels through which relative portions of the wavefront pass from one side of the material to the other. The amplitude of the beam segment passing through the respective channels is changed according to the established refraction index for that channel. The calculator design is such that the index of refraction can be changed dynamically so the output amplitude, or binary value, of the transmitted beam, also changes dynamically.

SUMMARY OF THE INVENTION

Among the several objects of the present invention may be noted the provision of a method employing phase active diffractive optics in an optical system by which classical optic elements such as lens and prisms are readily emulated; the provision of such a method to emulate these optical system components in a dynamic manner; the provision of such a method to locally control the index of refraction in a birefringent material to manipulate an optical wavefront impinging upon and passing through the material; the provision of such a method usable with light occurring in the ultraviolet, visible, near infrared, or far infrared portions of the light spectrum; the provision of such a method which is usable with both partially and fully coherent light and monochromatic and polychromatic light; the provision of such a method for spatially controlling the phase and amplitude of incident light as the light passes through an object; the provision of such a method to control phase and amplitude both dependently and independently; the provision of such a method to synthesize any aperture function to provide an optical image for an object; the provision of such a method to map any aperture function required to form any coherent image with the map subsequently being realizable; the provision of such a method to utilize an optically addressable spatial light modulator (OASLM) capable of a resolution up to 70 lp/mm; the provision of such a method to control deflection angles of incident waves impinging on the SLM by controlling the ramping of the index of refraction across the aperture of the SLM; the provision of such a method by which total phase depth is obtainable with the SLM with a single wave; the provision of such a method to allow the SLM to function as a "blazed" diffraction grating; the provision of such a method which is incorporated in a low cost system that allows conventional geometric optical components to be emulated; and, the provision of such a method which involves minimum or no moving parts.

In accordance with the invention, generally stated, a method is provided for effecting the desired optical characteristics of an optical system. The method employs a phase active diffractive optics system. Incident light is directed onto a piece of birefringent material through which the incident light passes, the light having a uniform wavefront (phase and amplitude) prior to impinging upon a surface of the material. The index of refraction of the material is spatially controlled by a controller capable of localizing the index of refraction so the index of refraction at one location on the material is different than that at another location thereon. In accordance with the method, a control unit includes a memory in which is stored mapping regimes for effecting various optical elements. Writing or mapping instructions are provided to a profiler to optically configure the material to emulate a particular optical element. Operation of the profiler is such that the optical element configuration is dynamically controlled. Thus, the index of refraction throughout the material causes for the material to present one optical component at one point in time and, if desired, a different optical component at a later time. Other objects and features will be in part apparent and in part pointed out hereinafter.

BRIEF DESCRIPTION OF THE DRAWINGS

FIGS. 1A–1D illustrate classical optical components including plane mirrors (FIG. 1A), a concave lens (FIG. 1B), a convex lens (FIG. 1C), a combination lens (FIG. 1D) and a wedge (FIG. 1E);

FIG. 2 illustrates the passage of a beam of light through a refractive element such as an optical wedge;

FIGS. 3A and 3B illustrate diffractive optical components and include a Fresnel lens (FIG. 3A) and a Fresnel wedge (FIG. 3B);

FIG. 4A illustrates a profitable piece of optical material used in a binary optical system, FIG. 4B a graph representing the index of refraction along the length of the block, and FIG. 4C the optical component which the block represents when the index is controlled as represented in the graph;

FIG. 5A is a first block diagram of optical system apparatus used to simulate any reflective, refractive, or diffractive component.

FIGS. 7–11 represent different system configurations wherein FIG. 7 represents use of the system in a first transmissive configuration, FIG. 8 represents use of the system in a second transmissive configuration, FIG. 9 represents use of the system in a third transmissive configuration, FIG. 10 represents use of the system in a first reflective configuration, and FIG. 11 represents use of the system in a second reflective configuration;

FIG. 15 is a log-log plot of index gradient versus the width of a liquid crystal portion of the SLM for different angles of deflection;

FIG. 16 is saw-tooth plot of refractive index gradient illustrating how total phase depth for an incident wave is obtainable with a SLM having only $2\pi$ phase depth capability;

FIG. 17 is a plan view of a diffraction grating;

FIG. 18 is a plot of the diffraction grating intensity distribution for a blaze of the first order;

FIG. 19 represents a thin lens whose primary and secondary focal planes are coincident with the lens; and, FIG. 20 illustrates an exit wave from the lens of FIG. 19, or its equivalent, as produced by the SLM of the optical system of the invention.

Corresponding reference characters indicate corresponding parts throughout the drawings.

DESCRIPTION OF PREFERRED EMBODIMENTS

Figure 5B:
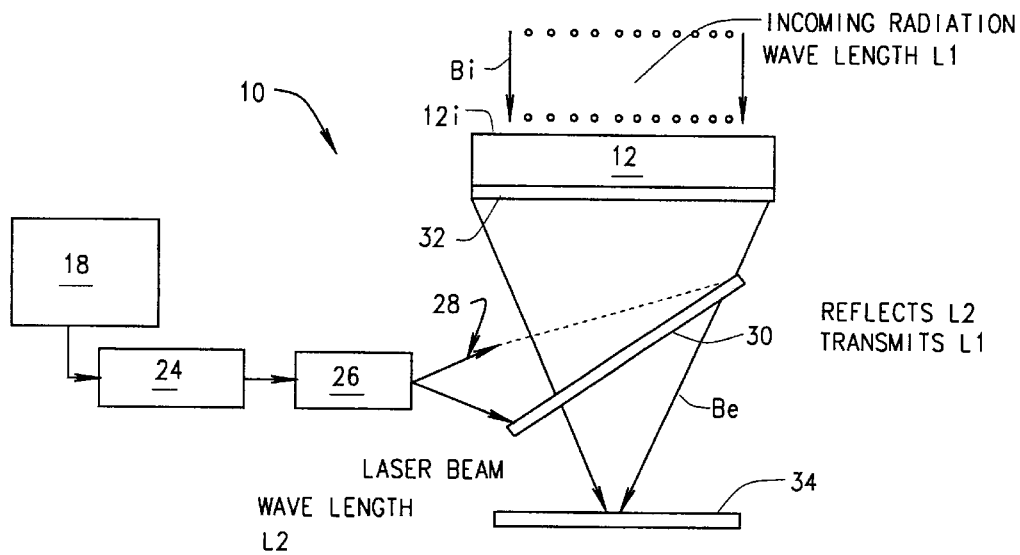
FIG. 5B is a second block diagram thereof.

Referring to the drawings, from their inception to the present, optical systems have been formed using geometrically shaped refractive and reflective components. These classical components, as shown in FIGS. 1A–1E include planar surfaces such as a mirror 1, concave and convex lenses 2 and 3 respectively, a combination lens 4, and a wedge 5. While not shown, various other optical components are also used in these systems. It is a feature of these components that they have the capability of bending or reflecting a collimated beam of light regardless of whether it is in the ultraviolet, visible, or infrared portion of the spectrum. This is shown in FIG. 2 in which a beam wavefront impinges on a surface 5F of a wedge 5 having an index of refraction n. As seen in the FIG. 2, the dashed line represents the direction of beam propagation, and the lines orthogonal to the dashed line the amplitude peaks in the beam. As the beam passes through the wedge, the wave bunches up due the index of refraction of the material. This is represented by the closer spacing between the peaks. As the wavefront of the beam emerges from the other side of the wedge, that portion which emerges first, i.e., that portion emerging from the narrower section of the wedge, now travels faster than the portion still passing through the wedge. This results in an emergent beam which is now bent at an angle Z with respect to the incident beam.

A second class of optical system components are those used in diffractive optical systems. A Fresnel lens 6 is shown in FIG. 3A, and a Fresnel wedge 7 in FIG. 3B. In each type of lens, a face 6F or 7F of the lens has been profiled; that is, one or both faces of the lens is cut or formed into a series of steps. Profiling causes the lens, for light of specific wavelengths, to act as a magnifier or a projector.

Referring to FIG. 4A, a block 8 of material is shown for use in a binary optics application. A surface 8F of the material has transparent electrodes 9 attached to it. Electrical current is supplied to each electrode from a source (not shown). Block 8 is a birefringent material. This means its index of light refraction can be different for the ordinary and extraordinary wavelength of the light. The particular index of refraction at any one point is controlled by the current applied to the particular electrode. The result is a series of light channels $C_i$. $.C_n$ extending along the length of the block. For a block of length 1, the index of refraction n can be varied as indicated by the graph of FIG. 4B. As a result the block is profiled so it is responsive to incident light. The block effectively produces optical components of the type shown in FIG. 1A–1E depending upon how it is profiled. For example, as shown in FIG. 4C, the effective profile of the block effectively produces, an optical wedge 8'. A drawback to this approach is that because of the level of accuracy required, the cost of such components is very expensive.

In FIG. 5A, an optical system 10 is shown in block diagram form for practicing the method of the invention. The optical system operates to allow a user to change the index of refraction of the material such as a block 12 of a birefringent material which is similar to the block 8 described above. In effect, system 10 enables the user to localize the index of refraction so the index of refraction over the material differs from one location to another location. This allows the user to profile the material to produce any optical component such as those shown in FIGS. 1A–1E, and 3A and 3B. Importantly, and as described hereinafter, with the optical system a user cannot only spatially control (profile) the material, but can also do so dynamically. In accordance with the method of the invention, the user is not only able to control the phase of the incident beam at any location on the material, but can do so such that the material effectively represents one optical component configuration at one instant, and a different optical component the next instant. In addition, this control is obtainable throughout the entire optical frequency band from ultraviolet through visible, to far infrared.

The inventors have developed a generalized optical transfer function, in a Fresnel approximation, that allows phase to be controlled in a spatial manner so equivalent geometrical optical components (such as optical components 1–5) can be emulated. To do this, however, requires a device in which spatial phase modulation can be implemented. Such a device has been developed using birefringent materials such as the birefringent materials used in optical computers. This device is described in co-pending application Ser. No. 08/192,656, now abandoned. In addition, the optical transfer function has been refined to produce a generalized transfer function which is implemented in the frequency domain. This means any aperture function can be synthesized to provide an optical image for an object. And, the transfer function can be utilized in systems involving either partially or fully coherent light, or monochromatic or polychromatic light.

The transfer function is usable with coherent, incoherent, and partially coherent light. In the case of coherent light, any diffraction is linear in wave amplitude. Therefore, the transfer function for imaging, designated $\tilde{H}(\vec{f})$ is:

$$\tilde{H}(\vec{f}) = \tilde{h}(\vec{f}) = T(\lambda z \vec{f}) e^{[i\pi(m+1)\lambda z \vec{f}^2]} \quad (1)$$

where T=amplitude transmission function for the aperture,
 f=two dimensional spatial frequency, and
 m=z/z=image distance/object distance.

For incoherent light, any diffraction is linear with respect to wave intensity ($U^*U$). This produces an intensity transfer function, also commonly designated the optical transfer function, $M(\vec{f})$. Those skilled is the art will recognize that the intensity transfer function for imaging can always be written as the autocorrelation of $\tilde{H}(\vec{f})$. That is, $$M(\vec{f}) = \int_{-\infty}^{+\infty} \tilde{H}(\vec{\mu}) \cdot \tilde{H}^*(\vec{\mu} - \vec{f}) d\vec{\mu} \quad (2)$$

This equation assumes a stationarity condition.

When equation (1) is used with expression (2), the result is $$M(\vec{f}) = \quad (3)$$

$$e^{\left(i\pi(m+1)\lambda z \vec{f}^2\right)} \int_{-\infty}^{+\infty} T^*(\vec{w} - \lambda z \vec{f}) \cdot T(\vec{w}) e^{\left(-2\pi i (m+1) \vec{w} \cdot \vec{f}\right)} d\vec{w}$$

Where $\vec{w} = \lambda z \vec{\mu}$.

For partially coherent light, diffraction is linear in mutual coherence, and characterized by a mutual coherence transfer function $L(f_1, f_2)$; i.e., a function of two spatial frequencies. Assuming stationarity for imaging, the function can be separated into the product of $\tilde{H}(\vec{f})$ values at the two frequencies. That is, $$L(\vec{f}_1, \vec{f}_2) = \tilde{H}(\vec{f}_1) \cdot \tilde{H}^*(-\vec{f}_2) \quad (4)$$

Again using equation (1), this produces $$L(\vec{f}_1, \vec{f}_2) = T(\lambda z \vec{f}_1) \cdot T^*(-\lambda z \vec{f}_2) e^{[i\pi(m+1)\lambda z (\vec{f}_{12}^* - \vec{f}_{22})]}$$

This mutual coherence function is a function of two points in space and a time delay. The time delay is defined by $$\Gamma(\vec{x}_1, \vec{x}_2, \tau_1) = <U(\vec{x}_1, T+\tau) U^*(\vec{x}_2, T)> \quad (6)$$

The expression sets forth the time average-over a long interval compared to the period of light radiation. Intensity can therefore be the mutual intensity at a single point with no time delay. Thus:

$$I(\vec{x}) = \Gamma(\vec{x}, \vec{x}, 0) = <U(\vec{x}, t) U^*(\vec{x}, t)> \quad (7)$$

Implementation of these functions for the particular type of light coherency allows for spatial control of phase and amplitude. These two constituents can be controlled either dependently or independently. As a result, any aperture function required to form any image can now be mapped. The map is realized using the method of this invention and the apparatus disclosed in co-pending application Ser. No. 08/192,589. Referring again to FIG. 5A, implementation of the invention means block 12 of material is controlled so it effectively functions as the optical wedge, for example. More importantly, by spatially altering the phase, the wedge angle can be made any desired angle. Similarly, for a lens, any curvature can be dynamically produced.

Figure 14:
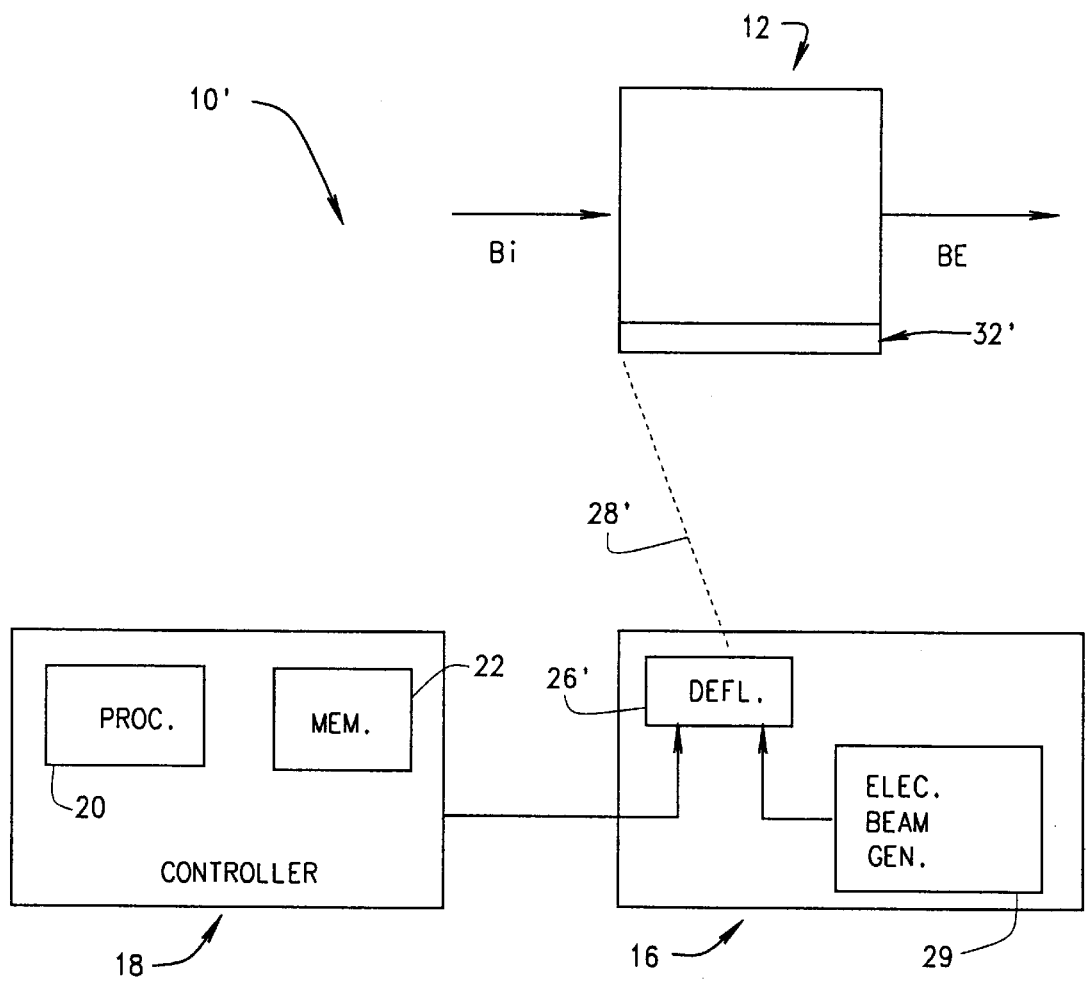
FIG. 14 is an alternate embodiment of a control apparatus from controlling operation of an SLM.

As shown in FIG. 5A, the ability to dynamically create any optical element is provided by an optically addressed, spatial light modulator (OASLM) 14. A profiler 16 is responsive to control inputs from a controller 18 to produce the appropriate geometric profile at any given time. Controller 18 implements the generalized Fresnel approximation functions developed by the inventors, and includes a processor section 20 and memory 22. Profile parameter algorithms and related system information (refraction indexes, for example) are stored in the memory. Processor 20 uses this information, together with other inputs from the optical system with which system 10 is used, to produce output signals which are provided to a control portion 24 and deflector 30 of the profiler 16. Profiler 16 includes a laser 26 which functions as a write beam 28 generator. The light output of laser 26 is directed through a deflector 30 toward profile elements 32 located on one face of SLM 12. Deflector 30 which is, for example, an acousto-optical (OA) coupler, is responsive to inputs from processor 20 and control 24 to move the light beam 28 across a matrix of the light elements 32. By doing so, each profile element 32 is controlled to provide a desired index of refraction for the channel through the OASIM associated with, or defined by, that particular matrix element. It will be understood that write beam 28, instead of being a laser beam, could also be an electronic beam. In such instance, laser 26 is replaced by an electron beam generator 331 shown in FIG. 14. Finally, the system includes a sensor 34 to which the modulator 14 output is directed. Sensor 34 could be a cathode ray tube (CRT), a forward looking infrared receiver (FLIR), or similar video receiver.

Spatial light modulators were initially developed for use in optical computers. As used therein, they were low resolution devices which only provided amplitude control. OASLM 12 of the present invention is, however, capable of a much higher resolution (up to 70 lp/mm). In addition to its higher resolution, the SLM was developed for its low power requirements, its versatility, and its rapid response time to write beam 32. It also can provide the desired amplitude and/or phase modulation previously discussed, and retention time. For phase modulation, it further provides phase modulation depth.

Understanding of the operation of optical system 10 can also be achieved with reference to FIG. 5B. FIG. 5B includes the same elements discussed above with respect to FIG. 5A but presented differently. As shown in FIG. 5B, incoming light radiation of a wavelength L1 impinges on one face of OASLM 12. Laser beam generator 26 produces the write beam 28 which is of a different wavelength L2. Controller 18 includes information for desired aperture functions simulated by the OASLM. Control 24 is responsive to control signals from controller 18 to control operation of the laser. The laser beam is directed at the deflector 30 which is, for example, a dichroic mirror which reflects light of wavelength L2, and transmits light of wavelength L1. The reflected write beam is directed at optically responsive matrix 32 for the index of refraction of OASLM 12 to be controlled. The resulting radiation of wavelength L1 passing through the dichroic mirror strikes sensor 34.

Figure 6A:
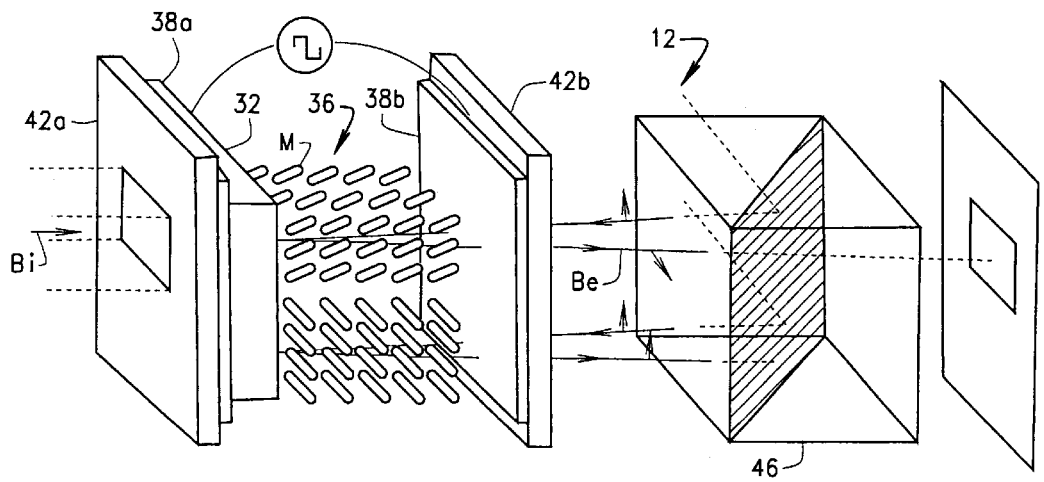
FIG. 6A represents a spatial light modulator (SLM) and associated controls and display.
Figures 6B, 6C, 6D:
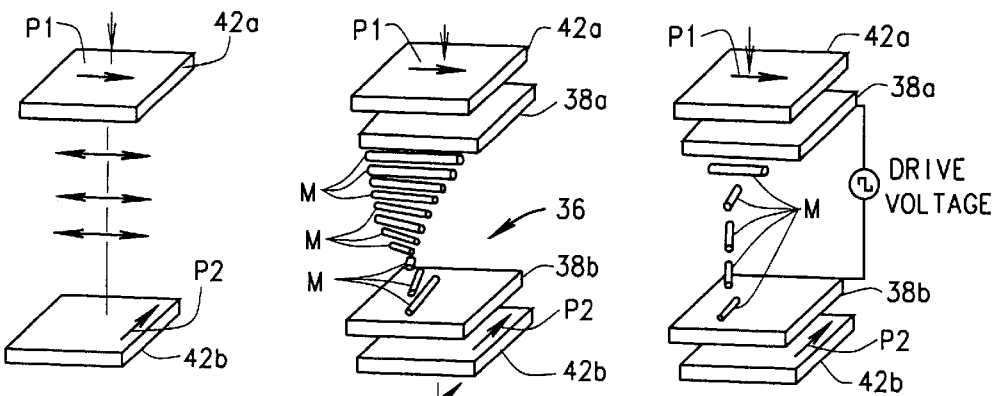
FIGS. 6B–6D illustrate how a liquid crystal portion of the SLM operates.
Figures 6E, 6F:
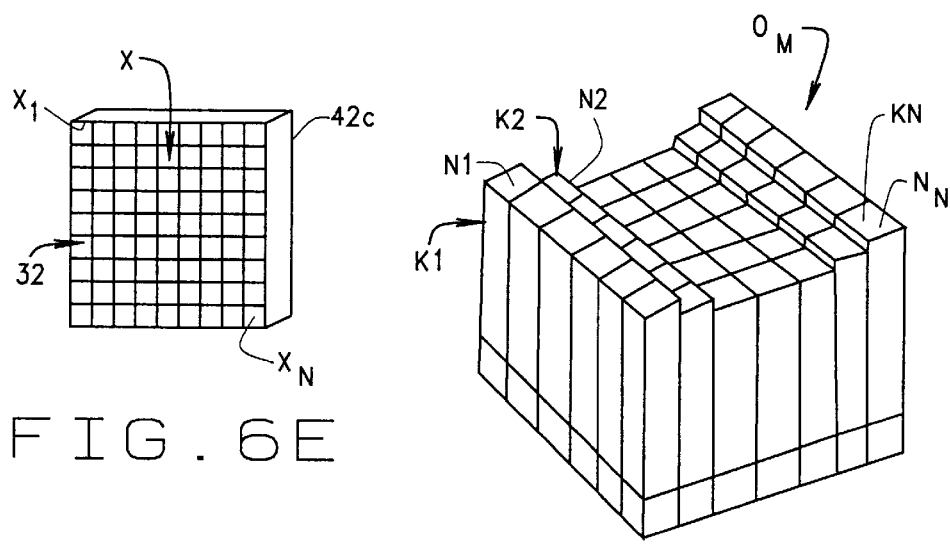
FIG. 6E depicts a matrix of elements on one face of the SLM for controlling index of refraction through defined segments of the SLM, and FIG. 6F a map of refraction indexes written onto the matrix for the matrix to emulate an optical element.

Referring to FIG. 6A, OASLM 12 is shown to include a ferroelectric liquid crystal (FeLC) 36. Each end of the crystal is coated with a transparent conducting oxide 38a, 38b, to form electrode plates. Located between the oxide coating 38a and the liquid crystal is a a-Si:H photodiode matrix comprising the matrix 32 previously discussed. A voltage differential is established between the plates 38a, 38b. Respective glass plates 42a, 42b, which are aligned parallel to each other, enclose the ends of the sub-assembly. The output light beam from the SLM is directed to a display screen 44 of sensor 34 through a polarizing beam splitter 46. As shown in FIG. 6E, the matrix of light elements 32 are attached to the outer face of end glass 42b. While the matrix is depicted in FIG. 6E as a square or rectangular matrix of k elements $K_1$–$K_n$, the matrix may have a circular, oval, or other configuration. Also, while matrix 32 is shown in FIG. 6A as comprising photodiodes and therefore responsive to the light beam 32, the elements K comprising the matrix could also be transparent electrical elements to which a current is applied.

The ability to use a birefringent material such as liquid crystal 36 results from the ability of the molecules M in the material to orient themselves in the presence of a field. This phenomenon is shown in FIGS. 6B–6D. As depicted in these FIGS., plates 42a, 42b act as polarizers, with the direction of light polarization in one plate being orthogonal to light polarization of the other. The polarization is indicated by the arrows P1, P2. With no drive voltage applied between the electrode plates, the molecules M in the liquid crystal, which form twisted nematic (TN) cells, align as shown in FIG. 6C. With this orientation, liquid crystal 36 is in effect transparent, allowing light impinging on plate 42a to pass through the liquid crystal. When, however, the voltage differential is established between plates 38a, 38b, the spiralling arrangement of molecules M is distorted, and the impinging light is absorbed by the OASLM.

It is an advantage of the invention to use write beam 28 to "write" onto matrix 32 an optical map $O_m$ generated by controller 18 for a particular refractive or diffractive optical element. While various write schemes are described herein, the effect of writing map $O_m$ on matrix 32 is shown with respect to FIG. 6F. After each "write" interval, different segments of the birefringent material have different indexes of refraction. Thus, as shown in FIG. 6F, map $O_m$ results in some segments of the material, for example segment K1 having an index of refraction $n_1$, a separate segment K2 an index $n_2$, and a third segment $K_n$ an index $n_n$. The overall effect of establishing these various refraction index values via map $O_m$ is to cause the OASLM to emulate a desired optical element. The period of time the OASLM represents that element depends upon the use of system 10. The emulation could be as brief as a single "write" interval; or, it could last the duration of a particular operation involving the system.

Figure 7:
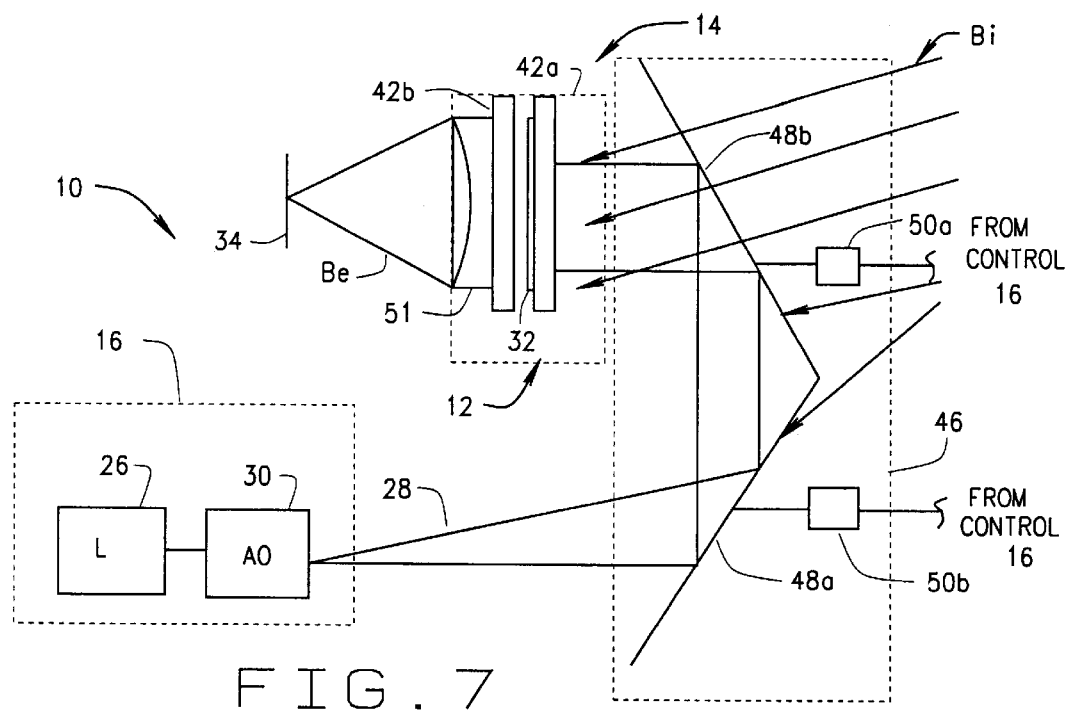

Referring to FIG. 7, system 10 is shown in a first application in which incident light is directed onto the matrix 32 of OASLM 12. This type application is referred to as a transmissive application. In such application, the OASLM is oriented such that matrix 32 is to the front end of the unit; i.e., the end on which the light impinges. Laser 26 of profiler module 16 has its laser beam output coupled through the acousto-optical coupler comprising deflector 30 of the profiler. The resultant write beam 28 is projected onto beam splitter 46 of modulator module 14. Beam splitter 46 includes two independent mirrors 48a, 48b. As shown, write beam 28 is projected onto mirror 48a, reflected from mirror 48a onto mirror 48b, and from mirror 48b onto plate 42a of the OASLM. Scrolling the write beam across the matrix, in order to control the index of refraction of the various segments of the OASLM can be accomplished in one of two ways. First, deflector 30 can be moved so that the write beam output is shifted back and forth across the matrix. Or, mirrors 48a, 48b can be mounted for independent movement within the beam splitter. Control 24 of profiler 16 then provides separate control signals to respective mirror positioners 50a, 50b. The positioners are responsive to these commands to independently move one mirror with respect to the other. In doing so, the write beam 28 is sequentially focused on each element comprising matrix 32. By co-ordinating changes in the write beam with the movement of the mirrors, the OASLM is controlled to represent the particular geometric optical component desired.

For the configuration represented in FIG. 7, the optical component being emulated passes the resulting image through a camera lens 51 onto sensor 34. Camera lens 51 has a focal length of, for example, 50 mm. Two factors to be considered in a set-up such as shown in FIG. 7 are, a) the relationship between sensor 34 and OASLM 12, and b) the effect of vibrations on the polarizer 46. The first of these factors is important in order to avoid vignetting. The second factor is important because vibrations can result in doubling of the image.

Figure 8:
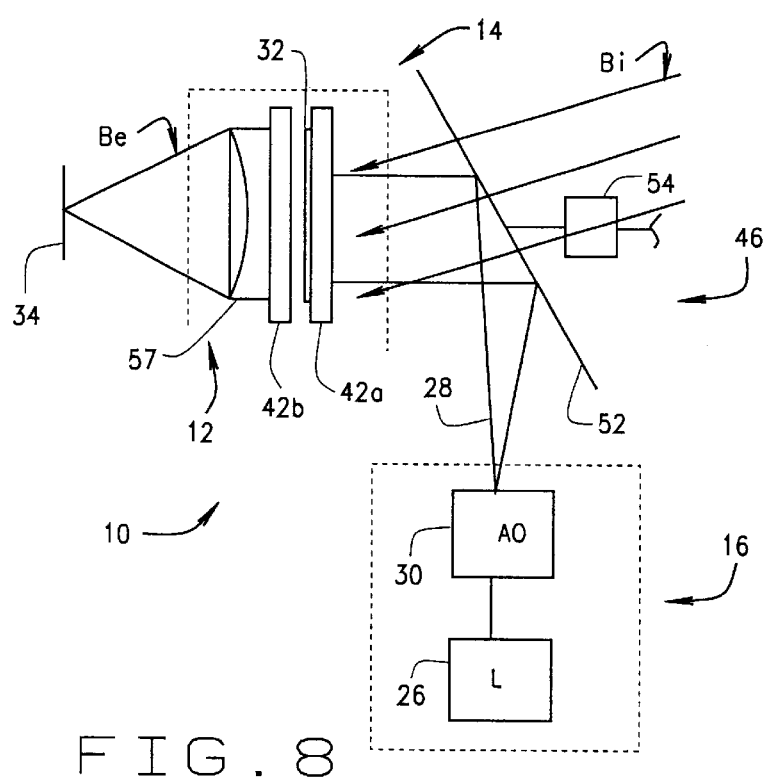

Referring to FIG. 8, system 10 is shown in a second transmissive application in which incident light is directed onto the matrix 32 of OASLM 12. Again, laser 26 of profiler module 16 has its output coupled through acousto-optical coupler 30 of the profiler, for write beam 28 to be projected onto beam splitter 46 of modulator module 14. In this application, only a single mirror 52 of beam splitter 46 is utilized, with write beam 28 being projected onto the mirror and reflected directly onto control matrix 32. Scrolling the write beam across the matrix, again to control the index of refraction of the various segments of the OASLM, is still accomplished one of two ways. First, deflector 30 is moved so the write beam output is shifted back and forth across the matrix. Or, mirror 52 is mounted for movement within the beam splitter with control 24 of profiler 16 providing control signals to a mirror positioner 54. The positioner moves mirror 52 with respect to the other. In doing so, the write beam 28 is sequentially focused on each element comprising matrix 32. As with the prior configuration, co-ordination of changes in the write beam with the movement of the mirrors, allows the OASLM to represent the particular geometric optical component desired. As with the FIG. 7 configuration, the resultant image is passed through a 50 mm. focal length camera lens 51 onto sensor 34. Since there is only one mirror used in this configuration, there is no double imaging problem which could be caused by vibration. However, care must again be taken to position the sensor and the OASLM so vignetting does not occur.

Figure 9:
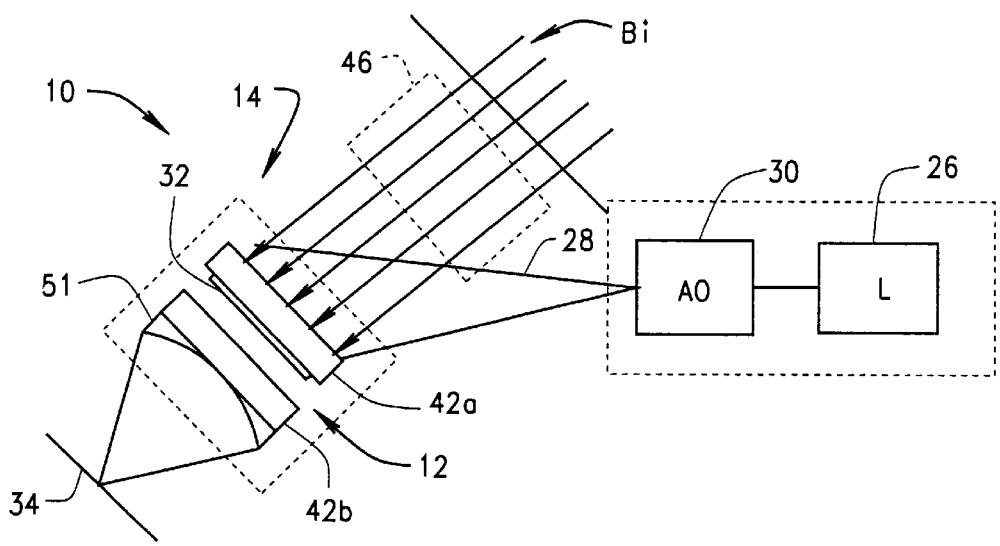

Referring to FIG. 9, a third transmissive application for system 10 is shown. As before, laser 26 of profiler module 16 has its output coupled through acousto-optical coupler 30 of the profiler. Now, instead of directing the write beam 28 onto matrix 32 using a system of one or two mirrors, the write beam is projected directly onto control matrix 32. Scrolling the write beam across the matrix to control the index of refraction of the various segments of the OASLM is accomplished by control of AO deflector 30 to shift the write beam back and forth across the matrix. In doing so, write beam 28 is sequentially focused on each element comprising matrix 32; and, co-ordination of changes in the write beam with this shifting allows the OASLM to represent the particular geometric optical component desired. Since no mirrors are used in this configuration, the double imaging problem discussed above is again avoided. Care, however, must still be taken to position the sensor and OASLM to avoid vignetting.

FIGS. 7–9 were directed to transmissive applications of system 10; i.e., the OASLM and profiler 16 were located such that matrix 32 is adjacent the end of the OASLM on which the image being processed through the OASLM impinges. In each instance, OASLM 12 is positioned in the line of sight (LOS) of the incident wave impinging on the OASLM. There are, however, applications in which the matrix is located on the opposite end of the OASLM from that on which the light impinges. These configurations are referred to as reflective. As with the system 10 configurations of FIGS. 7–9, the OASLM is again positioned in the LOS of the incident wave.

Figure 10:
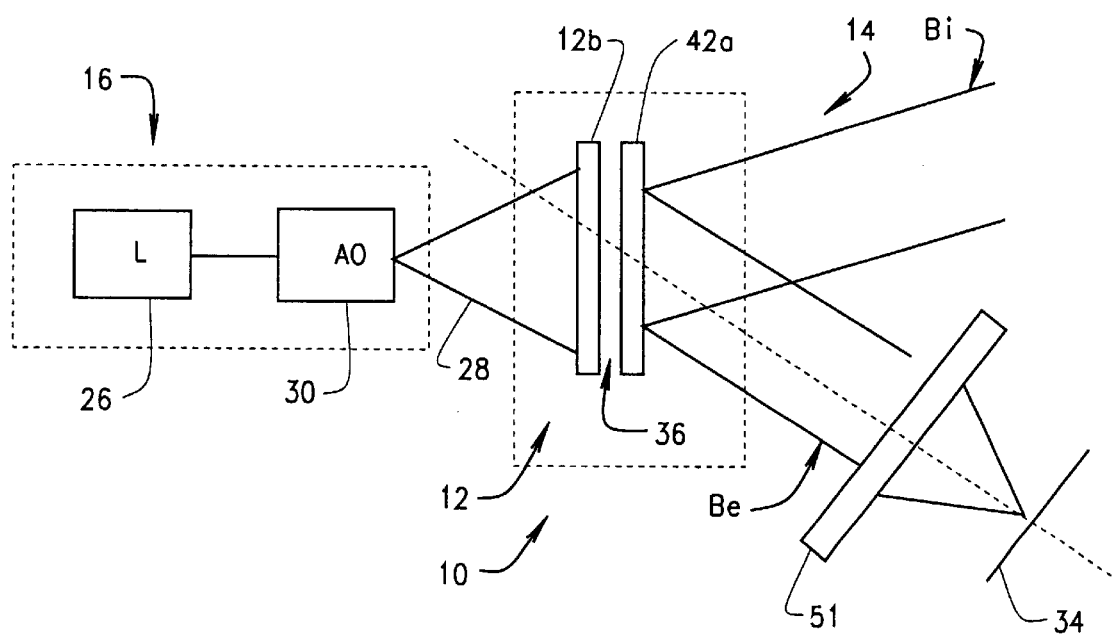

Referring to FIG. 10, a first reflective application for system 10 is shown. Laser 26 of profiler module 16 has its output coupled through acousto-optical coupler 30 of the profiler. The resulting write beam 28 is projected directly onto control matrix 32. Scrolling the write beam across the matrix to control the index of refraction of the various segments of the OASLM is accomplished by control of AO deflector 30 to shift the write beam back and forth across the matrix. In doing so, write beam 28 is sequentially focused on each element comprising matrix 32; and, co-ordination of changes in the write beam with this shifting allows the SLM to represent the particular geometric optical component desired. However, unlike the previously described system 10 applications, the incident light beam is projected onto end plate 42a of the SLM. The SLM now functions as a mirror to reflect the light beam. The optical characteristics of the mirror are the result of the control signals written onto matrix 32. The reflected light beam is directed onto sensor 34 through lens 51.

Overall, operation of system 10 is generally the same for this application as for transmissive applications. A major difference between the two is that the application of FIG. 10, like that of FIG. 9, does not require use of a polarizer 46.

Figure 11:
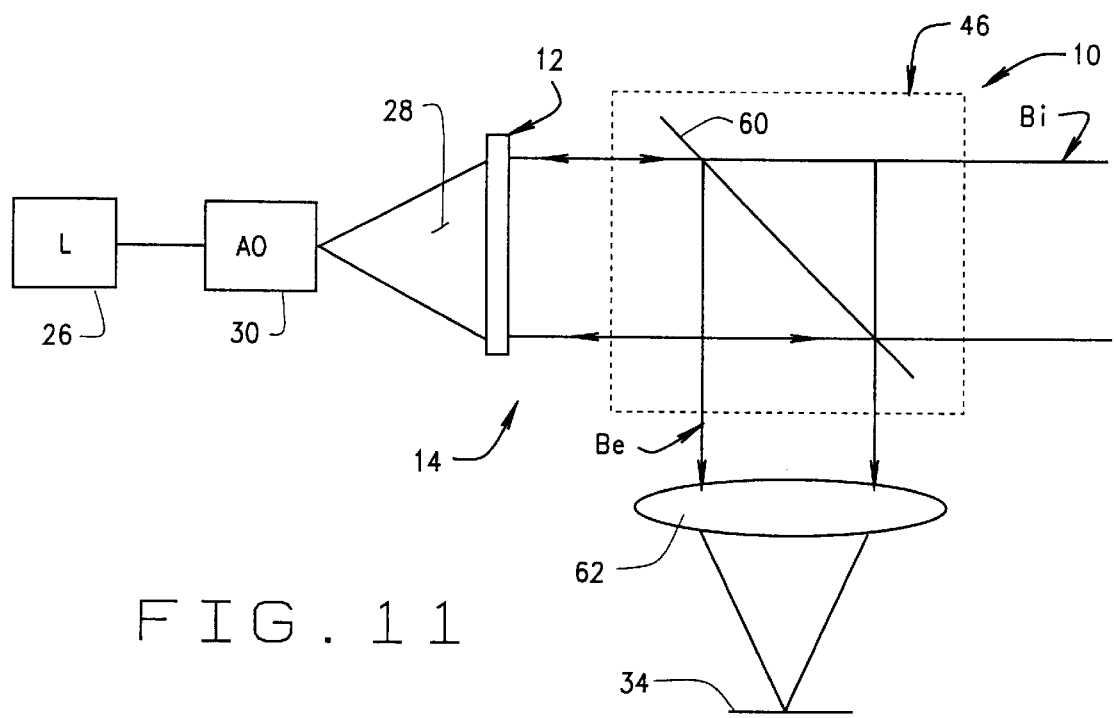

Referring to FIG. 11, a second reflective application for system 10 is shown. As in FIG. 10, laser 26 has its output coupled through acousto-optical coupler 30 and the resulting write beam 28 is projected directly onto control matrix 32. Scrolling of the write beam across the matrix controls the index of refraction of the various OASLM segments. Again this is accomplished by controlling deflector 30 to shift the write beam back and forth across the matrix for write beam 28 to be sequentially focused on each matrix 32 element. Co-ordination of changes in the write beam with the the shifting allows the OASIM to function like a mirror to reflect a light beam impinging on plate 42a of the OASLM. As with FIG. 10, the optical characteristics of the mirror are the result of control signals written onto matrix 32. Unlike FIG. 10, however, polarizer 46 is interposed between SLM 12 and sensor 34. The incident light beam passes through a dichroic mirror 60 of the polarizer and onto the OASLM. Because the OASLM acts like a mirror, the incident beam is reflected back onto mirror 60. Mirror 60 reflects the light beam through a lens 62 (which is similar to lens 51) and onto sensor 34.

It will be understood with respect to these various applications or configurations that the same principle of controlling the index of refraction spatially to create a geometric optical component is used throughout. This is so regardless of whether the application is transmissive or reflective, and whether or not the write beam is applied directly or indirectly to matrix 32. It will further be appreciated that while system 10 is effective with respect to amplitude control, phase control is limited to $2\pi$ because of the current capabilities of present materials and devices. As these are upgraded, the level of phase control will be accordingly improved over current levels. Achieving phase depths greater than $2\pi$ with the present materials involves use of a Fresnel lens 7 (see FIG. 3B) in any of the system configurations shown in FIGS. 7–11.

Figure 12:
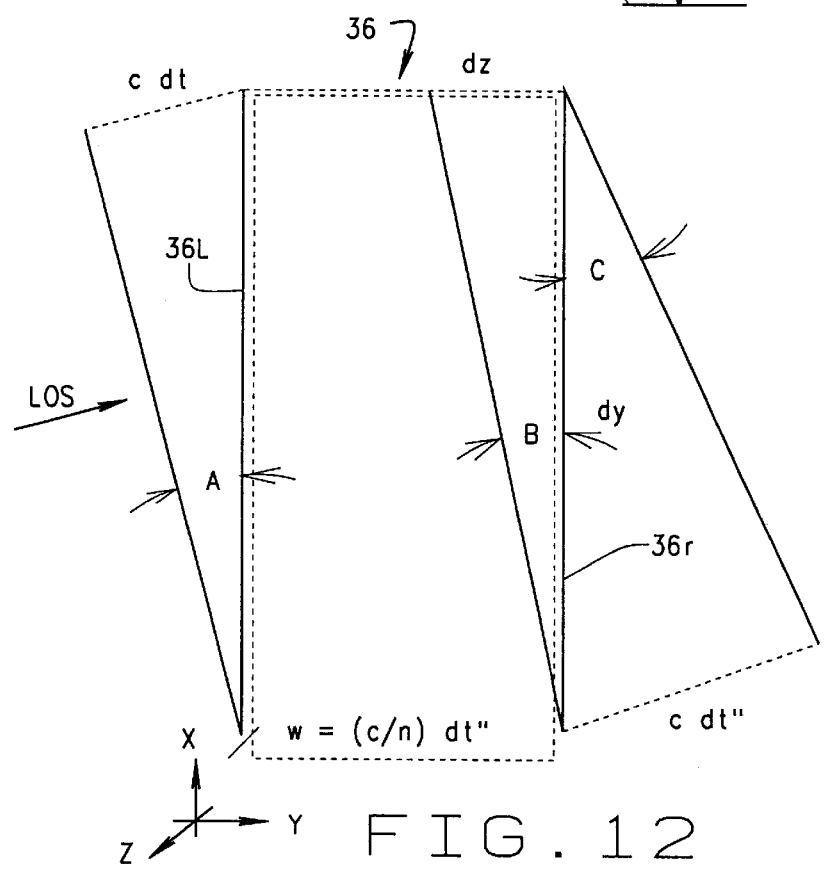
FIG. 12 is a representation of a wedge whose refractive index is approximated by a linear ramp function using a SLM.
Figure 13:
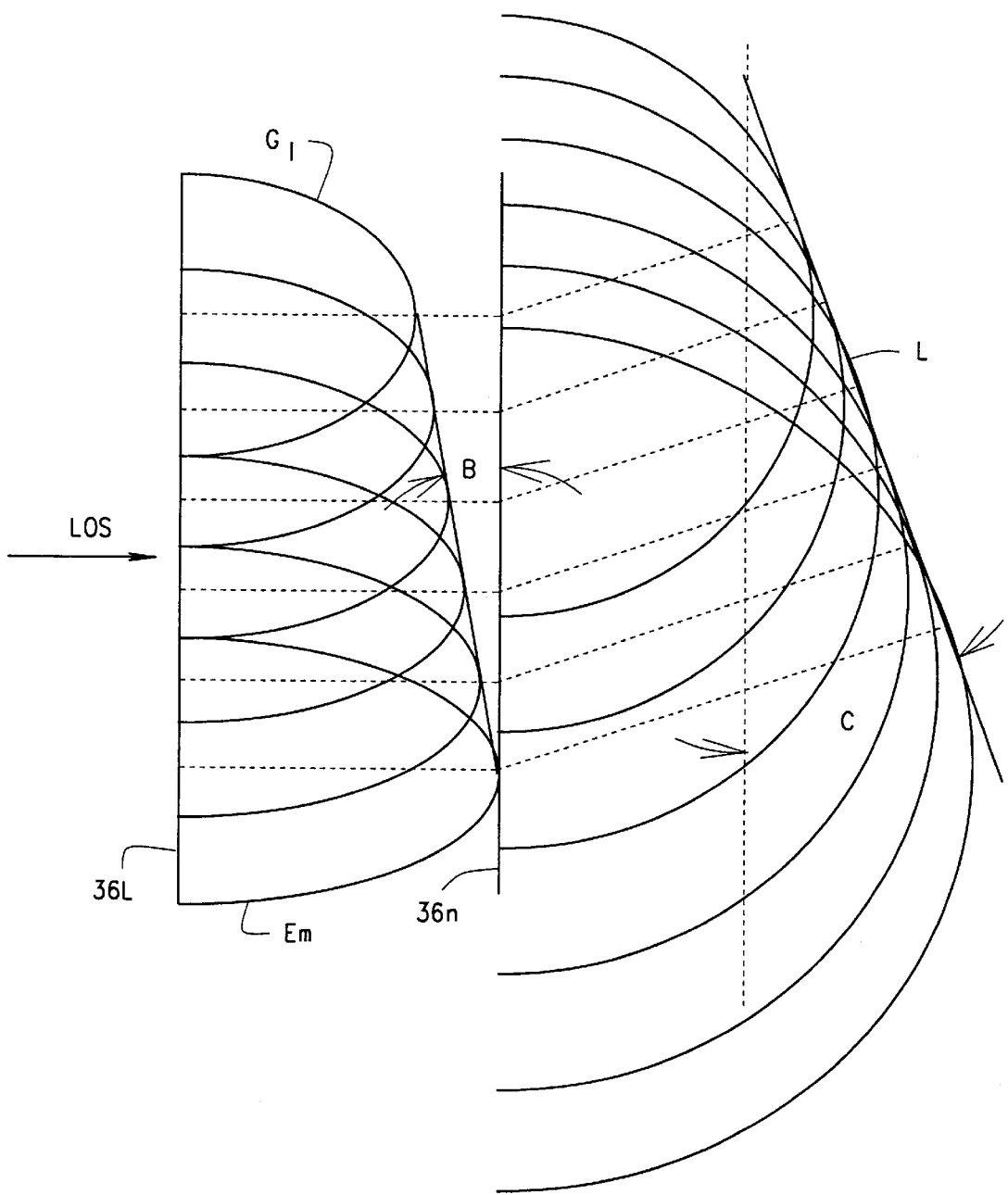
FIG. 13 represents a series of ellipsoidal wavelets the major axes of which define one side of an optical wedge.

Referring to FIG. 12, the equivalent of a wedge such as the wedge 5 of FIG. 1E is shown. The wedge is formed by creating a linear ramp in the refractive index n using OASLM 12. In FIG. 12, a length dy represents the liquid crystal 36 resolution cell size. This distance represents the the distance between major axes of the ellipses $E_1$–$E_n$ shown in FIG. 13. For the liquid crystal 36, an incident wavefront is shown impinging on the left side 36L of the cell at an angle A with respect to the cell. Accordingly, the incident rays are at a positive angle J with respect to the horizontal.

Because the wavefront impinges on side 36L at an angle, one ray of the wavefront (a lower ray) will reach the crystal before another ray (an upper ray). When an ellipsoidal wavelet $E_x$ of the lower extraordinary ray of the reaches the right side 36r of the cell, an imaginary line G joining the major axes of the ellipses has tilted at an angle N to the vertical. The wavefront emerging from the right side of the liquid crystal forms an angle C with respect to the vertical. The emerging wavefront forms the same angle with respect to the horizontal.

A time interval dt is required for an upper ray to reach the liquid crystal after a lower ray. This interval is defined by a right triangle having a hypotenuse dy and an associated angle A. That is, $$dy \sin A = c\, dt. \tag{8}$$

A time interval dt' is required for the other ray referred to above to reach side 36n of the liquid crystal. Assuming the one wavelet can be characterized by a refractive index of n along its major axis, then $$c\, dt' = w\, n, \tag{9}$$

where w is the width of crystal 36 along its z axis (see FIG. 12). In addition, a time interval dt" represents the time required for the one ray to finish transiting the cell after the other ray has finished. Assuming a positive change in the index of refraction with respect to y, the index characterizing the motion of the wavelet of this ray along its major axis is n +dn. And, $$c\, dt'' = dz(n+dn). \tag{10}$$

The incremental distance dz can be determined by measuring the time for the one wavelet to transverse liquid crystal 36 before the other wavelet reaches side 36r of the crystal. This interval is also given as dt'–dt. The wavelet is traveling at a speed c/(n+dn). Given these relationships, $$dz = w - (c/(n+dn))(dt'-dt). \tag{11}$$

If the relationship dy sin A=c dt, is substituted into the relationship c dt'=w n, the above equation can be restated as $$dz = w - (n\, w - dy \sin A)/((n+dn), \text{ or} \tag{12}$$

$$dz = (w\, dn - dy \sin A)/(n+dn). \tag{13}$$

With respect to FIG. 12, it can be seen that $$\tan B = dz/dy = (w\, dn/dy - \sin A)/(n+dn). \tag{14}$$

From this equation, the above expresses relationship for c dt", and FIG. 12, it will also be seen that $$\sin C = c\, dt''/dy, \tag{15}$$
$$= (n+dn)dz/dy,$$
$$= (n+dn)\tan B; \text{ or,}$$

$$\sin C = w\, dn/dy + \sin A. \tag{16}$$

This last relationship is important because it relates the exit angle C with the entrance angle A.

It will be understood from the above discussion and that with respect to FIGS. 5A and 5B, that one use of the apparatus of the optical system is to deflect an incidence beam of light from its LOS path. For an optical wedge whose operation is as described with respect to FIGS. 12 and 13, the effectiveness of the wedge in producing the desired direction of deflection is based on controller 18 and profiler 16 being able to generate a linear ramp of the refractive index which is then written on matrix 32 of the OASLM.

To achive the desired result, it must be shown that $$\sin V - \sin V_0 = w\, dn/dy, \tag{17}$$

where V is the exit angle of the radiation,
$V_0$ is the radiation entrance angle,
w is the thickness of liquid crystal 36, and
dn/dy is refractive index gradient in the desired direction.
According to the above equation, the magnitude of the deflection angle is a function of the magnitude of the refractive index gradient. And, the direction of the direction angle is a function of the direction of the gradient.

In general, if the incident radiation is centered by an imaging system lens to a center of a field-of-view (FOV), the angle X is 0°, and sin X=0. Substituting into the previous equation, one obtains, $$\sin X_0 = -w\, dn/dy. \tag{18}$$

The minus sign means the LOS deflection is in the direction in which the refractive index is decreasing.

Referring to FIG. 15, there is plotted index gradient as a function of the width, of liquid crystal 36. Two different deflection angles are plotted in FIG. 15. One plot is for a 2° deflection, and the other is for a 50 deflection. As an example, if liquid crystal 36 has a nominal width w of 10 μm. (0.04 in.), OASLM 12 produces a dn of approximately 0.1. in (approx. 1/80 mm). For these values, dn/dy can be shown to represent a deflection angle of approximately 5°. Because the reflection angle can be to either side of 0°, the total deflection from LOS can be 10°.

It is a particular advantage of the system and method of the present invention to provide both amplitude and phase control of an incident beam. With respect to phase control, it can be expressed in terms of phase delay. That is, $$p = wkn \tag{19}$$

where p is phase delay across a liquid crystal of width w, and Bk represents the wave number as calculated by 2π divided by the wavelength of the incident light. For the OASLM of the present invention, $$dp/dy = kw\, dn/dy. \tag{20}$$

For a conventional optical wedge, dp/dy can be replaced by the expression kn dw/dy. Making the substitution results in $$\sin X_0 = (1/k)dp/dy = (dp/2\pi)(L/dy). \tag{21}$$

The import of the relationship expressed in the equation is that if, for example, the deflection angle were 4°, the aperture of the liquid crystal were 25 mm. (1.0 in.), and the wavelength of the incident wave were 0.9 μm, dp/2π would approximately equal 1938. This means that a total retardation across the aperture (from one side to the other) would require 1938 waves. However, it is a feature of the invention that the total phase depth obtainable with OASLM 12 and the apparatus is 2π or a single wave.

As previously noted, current SLM design does not permit this to be accomplished in a straightforward manner.

However, the method of the present invention does facilitate total phase depth to be readily achieved. Waves are cyclical in phase. Because of this, the apparatus operates to effect a linear change in the refractive index of the liquid crystal 36 until an integral multiple of $2\pi$ is achieved. Once then is accomplished, the apparatus "steps back" the refractive index to whatever initial starting index value has been established by controller 18. A gradient or slope is thereby established. Now, the controller controls the laser write beam to repeat the same gradient. This process works even if the maximum obtainable phase depth is only $2\pi$.

Referring to FIG. 16, the graph illustrates that rather than a straight line or ramp function R for the index of refraction, the function now processed for liquid crystal 36 involves a periodic sawtooth waveform T. Importantly, the sloping portion of sawtooth T has the same slope s as the ramp R. The depth of the sawtooth gradient dn can be related to the maximum phase depth as:

$$dn = dp/kw = (2\pi)m/kw = m\lambda/w, \qquad (22)$$

where m is an integer, and $m\lambda = w(dn)$. Because the refractive index of OASLM 12 is periodic, based on the sawtooth pattern, the OASLM functions as a diffractive grating. It will be understood by those skilled in the art that a diffraction grating has defined angles of deflection for impinging monochromatic light radiation.

The formula for a diffraction grating is $$\sin X - \sin X_0 = m\lambda/d, \qquad (23)$$

where m is an integer, and d is the grating period. The value m represents the order of the spectrum. In a typical diffraction grating screen 100 such as that shown in FIG. 17, parallel openings 102 are separated by opaque elements 104. With such a screen, incident light radiation has its power spread throughout all possible orders; i.e., X is less than 90°. As is well-known, most of this power is in the zero order where m=0, and $X=X_0$. There are "blazed" gratings in which the exiting power of the incident wave is concentrated in a single order with i4 being unequal to zero. A blazed grating is one in which gratings are set at a defined deflection angle. Blazed gratings work by using light reflection or refraction to concentrate the light energy in a single preferred order. Also, these gratings also include reflecting facets which are oriented such that the angle of reflection for a given angle of incidence equals the angle X set forth in the above equation.

Theoretically, a transmission grating provides a similar result by making the opaque elements 104 into refracting prisms. The refractory angle of the prisms would also equal X as set forth above. Because of the difficulty in forming prisms in a grating, such an approach with classical diffraction gratings such as grating 100 is impractical. However, use of OASLM 12 for this purpose conforms with the various operating techniques discussed above. As set forth above, $$\sin X - \sin X_0 = w \, dn/dy, \text{ and} \qquad (24)$$

$$\sin X - \sin X_0 = m\lambda/d. \qquad (25)$$

To make a selected angle of a refractive index gradient equivalent to that selected by the grating effect, the above expressions are set equal to each other. Thus, $$w \, dn/dy = m\lambda/d. \qquad (26)$$

As further set out above, $$dn = m\lambda/w, \text{ or} \qquad (27)$$

$$w \, dn = m\lambda. \qquad (28)$$

Making the appropriate substitution, $$w \, dn/dy = w \, dn/d = dp/(kd), \qquad (29)$$

$$m\lambda/d = \lambda dp/(2\pi)(d), \text{ and} \qquad (30)$$

$$dp = 2\pi (m). \qquad (31)$$

Accordingly, by satisfying the conditions that allow OASLM 12 to function as a blazed grating corresponds with one set of preferred operating conditions for the system. That is, the refraction angle equals the diffraction angle for an order m unequal to zero. Therefore, in accordance with the sawtooth waveform plot of FIG. 16, if the refractive index is set back to its original starting value after the phase depth reaches $2\pi$ times the selected integer value, a blazed grating is created with a blaze of an order corresponding to the integer.

A normalized intensity distribution for the far-field pattern of a diffraction grating such as grating 100 is expressed as:

$$I(p) = H(N, kdp/2)I_0(ksp/2), \qquad (32)$$

where $p = \sin X - \sin X_0$,

H is an intensity function due to N total lines, $I_0$ is the intensity of one line by itself, and s is the size of one slit 102. Further, $$H(N,x) = (\sin (Nx))^{2/N \sin x)2} \qquad (33)$$

In an ordinary grating 100 where there is no blazing, the slit size is less than the grating period (s<d). d This means the transmitting or reflecting portion of a facet is not as large as the period of the grating. I.e., some of the aperture is not used. Also, the intensity function $I_0$ of a single line equals the single slit diffraction pattern; or, $$I_0(x) = (\sin x)^2/(x)^2. \qquad (34)$$

A major difference between an ordinary diffraction grating, and the diffraction grating produced with the apparatus and method of the present invention, is that with OASLM 12 the size of the slit can be made to approximately equal to the grating period. This is accomplished by making the flyback portion F of the sawtooth pattern in FIG. 16 very sharp. The more horizontal the line portion F of the pattern can be made, the better an approximation is achieved.

With a blaze pattern of order m, the single slit diffraction pattern determined in accordance with the preceding equation is displaced through an angle consistent with that order. Thus, $$I_0(x) = (\sin (x - m\pi))^2/(x - mx)^2. \qquad (35)$$

This equation has a maximum value for $x = kdp/2 = m/(dp/\lambda - m)$, rather than for $x = 0$.

Referring to FIG. 18, there is plotted both single line intensity $I_0$ (the dotted line plot), and the density function H due to the total number of lines (the solid line plot). For the FIG., the number of grating lines N is seven. Typically, there are seven or more grating lines in a diffraction grating. It will be noted that for the condition s=d, when H and $I_0$ are multiplied together, the net result is that only one order is selected. The maximum value of $I_0$ falls only on the mth order peak of H. Otherwise, for the peak values of H, the values of $I_0$ are zero. Further with respect to FIG. 18, it will be noted that for s=d, the effect is to spread the single slit pattern with respect to the multiple slit pattern. In this situation, portions of the peaks of both H and $I_0$ will begin to become dominant for orders other than m. This means that if the flyback portion F of the sawtooth curve of FIG. 16 is not sharp, powers will begin to appear for the orders other than m.

Phase shift can be related directly to the index of refraction. The number of waves can be fitted across a liquid crystal 36 is determined by the formula $$N=w/(\lambda/n) \tag{36}$$

where w is the width of the liquid crystal, n is the refractive index of the extraordinary ray, and $\lambda$ is the wavelength of the light in air. The phase shift for a given number of waves is $2\pi$ times that number. Accordingly, $$p=(2\pi)nw/\lambda=kwn, \tag{37}$$

where $k=2\pi/\lambda$. If the phase shift is considered as function of the exit plane; i.e., the resultant angle C in FIG. 14, then $$p(x,y)=kwn(x,y). \tag{38}$$

The relationship expressed in this equation means that the phase shift distribution across the exit plane defined by angle C is directly proportional to the extraordinary ray index distribution in a similarly oriented plane. The phase shift represents the change in phase crossing the third (z) dimension of the crystal.

Phase delay, which is a function of x and y, is introduced by a spherical lens of focal length f. The value of the phase delay is a function of two times the focal length. Expressed mathematically, $$p(x,y)=k\rho^2/2f \tag{39}$$

where $\rho^2=x^2+y^2$. The above expression yields the phase distribution at the secondary principal plane of the lens. For a thin lens 110 such as shown in FIG. 19, the primary and secondary planes q1 and q2 respectively, may be considered coincident with the lens itself. Again with respect to OASLM 12, the phase distribution can be considered the distribution at the exit face (plate 42b) of the OASLM.

Referring to FIG. 20, the above equation can be shown to result in a spherical wave W which is centered at a point D along an axis A of the exit plane from the lens. From a point on the exit plane a distance P from the axis, the additional distance d to the focal point is $$d=(r^2+f^2)^{1/2}-f, \text{ or} \tag{40}$$

$$d=f(1+(r^2/f^2))^{1/2}-f. \tag{41}$$

Phase difference as a function of the distance $\rho$ from axis A is therefore $$p(\rho)=(2\pi)d(p)/\lambda. \tag{42}$$

If it is assumed that the exit aperture from OASLM 12 is small compared with the focal length, the above expression for d can be expanded into a binomial series whose initial terms are $$(r^2/f^2))^{1/2}=1+\tfrac{1}{2}(r/f)^{1/2}-\tfrac{1}{8}(r/f)^{1/4}+.. \tag{43}$$

If only the first two terms of the above expression are considered and are substituted into the previous equation for d, the result is $$d(\rho)=\rho^2/2f, \tag{44}$$

and the phase difference as a function of p is $$p(\rho)=k\rho^2/2f. \tag{45}$$

This latter equation corresponds to that set forth above for p(x,y). Accordingly, the phase distribution results from liquid crystal 36 of OASLM 12 producing an output wave which is a spherical wave centered on the focal point.

From the previously set forth equation $$p(x,y)=kwn(x,y), \tag{46}$$

it will be understood that to produce a spherical output wave centered on a focal point means the index of refraction must be varied radially, and in a quadratic manner. The index of refraction equation stored in controller 18 and used to control the write beam 28 directed at matrix 32 could thus include an algorithm such as $$n=n_0-a\rho^2. \tag{47}$$

Here, $n_0$ is the refractive index at the center of crystal 36. The negative sign results in a positive focusing effect. If the sign were positive the SLM would function as a "negative" lens. The index of refraction at the edges must be less than that at the center of the crystal in order for the plane waves at the outer margin of the crystal to exit from OASLM 12 prior to the waves at the center of the crystal. By comparing the equations $$p(\rho)=k\rho^2/2f \tag{48}$$

$$n=n_0-a\rho^2, \text{ and} \tag{49}$$

$$p(x,y)=kwn(x,y), \tag{50}$$

it can be determined that the appropriate relationship can be expressed as $$a=1/(2wf). \tag{51}$$

This last equation produces a value representing the constant used in the expression for the refractive index is ascertained as a function of the cell width of liquid crystal 36 and the desired focal length.

With respect to the above expression $$(r^2/f^2))^{1/2}=1+\tfrac{1}{2}(r/f)^{1/2}-\tfrac{1}{8}(r/f)^{1/4}+.., \tag{52}$$

if the terms beyond the quadratic one are disregarded, aberrations in focusing will occur. In particular, neglect of the quartic term ($\tfrac{1}{8}(r/f)^{1/4}$) leads to the classical, third order Seidel spherical aberration. A sphere is not a perfect shape for providing perfect focus in either reflection or refraction. As those skilled in the art will recall, this is referred to as a third order aberration because the transverse and lateral errors introduced at the Gaussian image plane are proportional to the derivative of the phase front with respect to $\rho$. This, in turn, is proportional to $\rho^3$. Correction of this aberration is done by modifying the algorithm used by controller 18 to include a quartic term for determining the index of refraction. Thus, the above expression $$n=n_0-a\rho^2 \tag{53}$$

is revised to $$n = n_0 - a\rho^2 + b\rho^4. \quad (54)$$

By performing a comparison similar to that described above, the appropriate expression for b is found to be $$b = \lambda/(8wf^3). \quad (55)$$

From the foregoing, it will be understood that focusing and spherical aberration correction (for all orders) involves only even powers of $\rho$. The FOV correction previously discussed requires only a linear variation of refractive index with the deflection dimension. The significance of this is that both types of corrections can be performed independently of each other in liquid crystal 36 of OASLM 12.

What has been described is a phase active diffractive optical system and method. The method of the invention uses the phase active diffractive optical system to simulate classical optic elements such as lens and prisms. The emulation is done either electronically or optically. The method involves use of a spatial light modulator made of a birefrin material in which the index of refraction is locally controlled to control the optical wavefront impinging upon and passing through the material. The method is usable in systems involving both partially coherent and chromatic light, and systems working with light in the ultraviolet, visible, near infrared, or far infrared portions of the light spectrum. The method allows the phase and amplitude of an incident light beam to be controlled in a spatial manner as the beam passes through an OASLM, phase and amplitude being controllable either dependently, or independently. Using the method of the invention, any aperture function required to form any coherent image is mappable with the map subsequently being realizable. The OASLM is electrically or optically addressable, and its use results in a method that employs a low cost system that allows conventional geometric optical components to be readily emulated, and which requires no moving parts. With the method, deflection angles of incident waves impinging on the OASLM are controlled by controlling the ramping of the index of refraction across the aperture of the device. Also, total phase depth is obtainable with the OASLM with a single wave. Also, use of the method allows, for example, the emulation of a diffraction grating in which the size of the slits in the grating can be made approximately equal to the grating period. The method accomplishes this by producing an index of refraction curve having a sawtooth pattern with the flyback portion of the pattern being very sharp. The more horizontal the flyback portion of the pattern can be made, the better the approximation.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A method for affecting the desired optical characteristics of an optical system using phase active diffractive optics comprising:

directing incident light onto a material whose index of refraction is continuously and spatially variable over a surface area of the material, passage of the incident light through the material affecting the phase and amplitude of the light waveform;

determining an optical map for said surface of said material, said map comprising variations in the index of refraction over the surface of said material, and said map representing any of a range of refractive and diffractive optical elements whereby said material emulates a selected optical element;

continuously controlling the phase of said incident light across a wavefront of said light waveform by dynamically writing said map onto said material to map said material such that said incident light's passage through said material corresponds to the passage of said light through the optical element currently being emulated by said material, the phase of said waveform being continuously controllable from a phase depth of zero to a phase depth substantially greater than $2\pi$, whereby emergent light from the material has similar amplitude and phase characteristics as if the incident light had passed through a refractive, diffractive, or composite optical element being emulated, the controlling operations and the determining of said optical mapping implement the optical transfer function:

$$M(\vec{f}) = e^{\left(i\pi(m+1)\lambda z \vec{f}^2\right)} \int_{-\infty}^{+\infty} T*\left(\vec{w} - \lambda z \vec{f}\right) \cdot T(\vec{w}) e^{\left(-2\pi i(m+1)\vec{w}\cdot\vec{f}\right)} d\vec{w}$$

where:

m=z/z is the image distance/the object distance;

$\lambda$ is the wavelength;

$\vec{w} = \lambda z \vec{\mu}$ is the wavelength × image distance × two dimensional spatial frequency variable of integration;

T is the amplitude transmission function for the aperture;

$\vec{f}$ is a two dimensional spatial frequency; and sensing the emergent light with a forward looking infrared receiver.

* * * * *